United States Patent
Ran

(10) Patent No.: US 12,323,740 B1
(45) Date of Patent: Jun. 3, 2025

(54) MULTI-MONITOR AUTOMATIC AUDIO FEED ADJUSTMENT

(71) Applicant: INTERNATIONAL BUSINESS MACHINES CORPORATION, Armonk, NY (US)

(72) Inventor: Xiao Song Ran, Knoxville, TN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/526,173

(22) Filed: Dec. 1, 2023

(51) Int. Cl.
G06F 3/01 (2006.01)
G09G 5/14 (2006.01)
H04N 7/08 (2006.01)
H04N 7/14 (2006.01)
H04N 7/18 (2006.01)

(52) U.S. Cl.
CPC ............ H04N 7/181 (2013.01); G06F 3/011 (2013.01); G09G 5/14 (2013.01); H04N 7/0806 (2013.01); H04N 7/14 (2013.01)

(58) Field of Classification Search
CPC ........ H04N 7/181; H04N 7/0806; H04N 7/14; G06F 3/011; G09G 5/14
See application file for complete search history.

(56) References Cited

U.S. PATENT DOCUMENTS

| 2006/0004579 A1 | 1/2006 | Claudatos |
| 2014/0362201 A1 | 12/2014 | Nguyen et al. |
| 2020/0006988 A1* | 1/2020 | Leabman ................. A61B 8/56 |
| 2023/0146178 A1 | 5/2023 | Haro |
| 2023/0334966 A1* | 10/2023 | Ullah ..................... G06V 20/52 |

FOREIGN PATENT DOCUMENTS

| CN | 111756929 A | 10/2020 |
| WO | 2000056074 A1 | 9/2000 |
| WO | 2013036237 A1 | 3/2013 |

OTHER PUBLICATIONS

Amazon, "wearable camera glasses," Amazon.com, Datasheet, [Accessed on Oct. 17, 2023], 5 pages, Retrieved from the Internet: <URL: https://www.amazon.com/s?k=wearable+camera+glasses&crid=3QNB8UCRR0GL8&sprefix=wearable+camera+glasse%2Caps%2C306&ref=nb_sb_noss_2>.

(Continued)

*Primary Examiner* — Robert J Michaud
(74) *Attorney, Agent, or Firm* — Teddi E. Maranzano

(57) ABSTRACT

According to at least one embodiment, a method, a computer system, and a computer program product for multi-monitor automatic audio feed adjustment is provided. The present invention may include receiving captured video and audio feeds from surveillance/security cameras; displaying at least one of the captured videos in at least one monitor in a multi-monitor setup; continuously analyzing a captured live video stream to detect one or more monitors in the multi-monitor setup; determining a currently viewed monitor in the multi-monitor setup using one or more computer vision techniques; and automatically outputting either a one-way or two-way audio feed that is synchronized with a video feed that corresponds with the currently viewed monitor.

17 Claims, 3 Drawing Sheets

(56) References Cited

OTHER PUBLICATIONS

Disclosed Anonymously, "Method and System for Real-Time Controlling of Audio Levels from Multiple Sources by Monitoring User Activities and Preferences," IP.com, Feb. 27, 2018, 3 pages, IP.com No. IPCOM000253004D, Retrieved from the Internet: <URL: https://priorart.ip.com/IPCOM/000253004>.

Elahi, et al., "Webcam-Based Accurate Eye-Central Localization," 2013 Second International Conference on Robot, Vision and Signal Processing [conference paper], Dec. 2013 [accessed on Oct. 17, 2023], pp. 47-50, DOI: 10.1109/RVSP.2013.19, IEEE, Retrieved from the Internet: <URL: https://ieeexplore.ieee.org/document/6829979>.

Authors et al., "Determine the relative position of multiple screens ED—Darl Kuhn", ip.com, Ip.com Inc., West Henrietta, NY, us, Nov. 6, 2020, 05 pages, XP013188262, ISSN: 1533-0001 the whole document.

Authors et al., "Determining the Currently Viewed Monitor in Multi-Monitor Systems Using Wearable Cameras to Capture Signature Marks Displayed at the Corners of The Screens ED—Darl Kuhn", ip.com, Ip.com Inc., West Henrietta, NY, us, Jul. 10, 2024, 07 pages, XP013198034, ISSN: 1533-0001.

Breuninger et al., "Implementing gaze control for peripheral devices", Proceedings of the 1st International Workshop on Pervasive Eye Tracking & Mobile-Based Interaction, Petmei 1 11, Jan. 1, 2011, 5 pages, XP055201563, New York, New York, USA DOI: 10.1145/2029956.2029960 ISBN: 978-1-45-030930-1 abstract figures 2,4,5.

International Searching Authority, "Notification of Transmittal of the International Search Report and the Written Opinion of the International Searching Authority, or Declaration," Patent Cooperation Treaty, Jan. 31, 2025, 13 pages, International Application No. PCT/IB2024/061470.

Zhang et al., "Watching the TV Watchers", Proceedings of the ACM on Interactive, Movile, Wearable and Ubiquitous Technologies, ACMPUB27, New York, NY, USA, vol. 2, No. 2, Jul. 5, 2018, pp. 1-27, XP058485184, DOI: 10.1145/3214291 abstract figure 1 Second full paragraph; pp. 88-2 Section 3.

* cited by examiner

MULTI-MONITOR AUTOMATIC AUDIO FEED ADJUSTMENT

BACKGROUND

The present invention relates generally to the field of information technology, in particular, to multi-monitor systems.

Closed-circuit television ("CCTV") is a TV system where signals are privately monitored, primarily for surveillance and security purposes. CCTV systems usually comprise multiple security/surveillance cameras that are connected to a computing device. The computing device can display the captured video feeds from the cameras on one or more monitors/screens. Additionally, the computing device can output the captured audio feeds from the cameras.

SUMMARY

Embodiments of a method, a computer system, and a computer program product for multi-monitor automatic audio feed adjustment are described. According to one embodiment, a method, computer system, and computer program product for multi-monitor automatic audio feed adjustment may include receiving captured video and audio feeds from surveillance/security cameras; displaying at least one of the captured videos in at least one monitor in a multi-monitor setup; continuously analyzing a captured live video stream to detect one or more monitors in the multi-monitor setup; determining a currently viewed monitor in the multi-monitor setup using one or more computer vision techniques; and automatically outputting either a one-way or two-way audio feed that is synchronized with a video feed that corresponds with the currently viewed monitor. Additionally, according to one embodiment, a method, computer system, and computer program product for multi-monitor automatic audio feed adjustment may also include determining whether a different monitor in the multi-monitor setup is being viewed; and upon determining that the different monitor in the multi-monitor setup is being viewed, dynamically switching the outputted audio feed to an audio feed that is synchronized with a video feed that corresponds with the different monitor being viewed.

BRIEF DESCRIPTION OF THE SEVERAL VIEWS OF THE DRAWINGS

These and other objects, features, and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
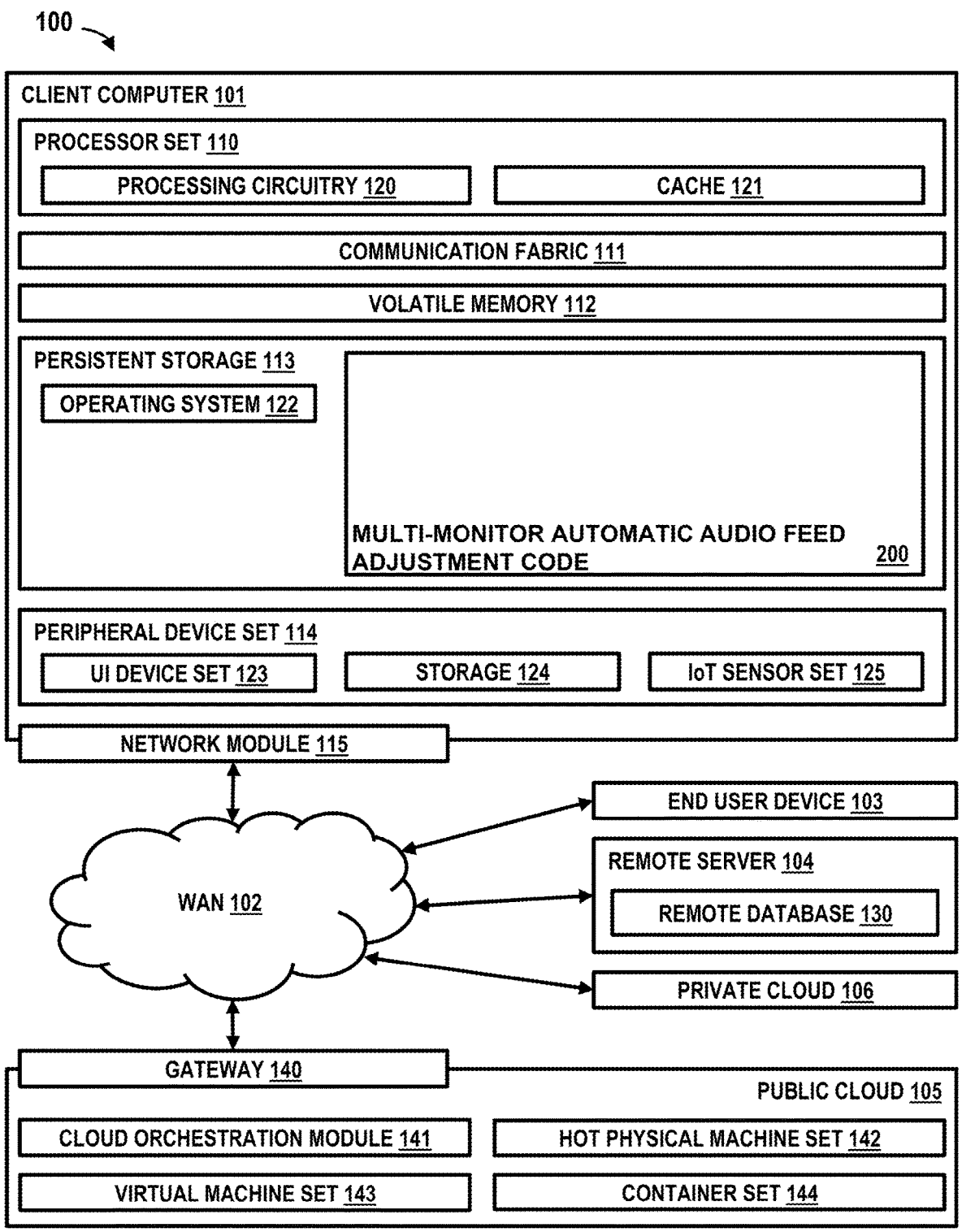
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention relate generally to the field of information technology, in particular, to multi-monitor systems. The following described exemplary embodiments provide a method, computer system, and computer program product to, among other things, automatically switch an outputted audio feed to an audio feed synchronized to the video feed being displayed on the monitor being viewed in a multi-monitor system. Therefore, according to an aspect of the invention, the present embodiment has the capacity to improve multi-monitor systems by dynamically determining which monitors one or more users are viewing at any given time and adjusting the outputted audio feed in one or more headphones accordingly to match the audio feeds of the respective displayed video feeds being viewed on the monitors.

As previously described, CCTV is a TV system where signals are privately monitored, primarily for surveillance and security purposes. CCTV systems usually comprise multiple security/surveillance cameras that are connected to a computing device. The computing device can display the captured video feeds from the cameras on one or more monitors/screens. Additionally, the computing device can output the captured audio feeds from the cameras. However, a user is limited in their ability to dynamically control which captured audio feed they are receiving, thus, hindering the user's ability to simultaneously monitor audio feeds from various cameras. Additionally, solutions for efficiently switching audio feeds independently for multiple users remain absent, thus, limiting collaborative audio monitoring capabilities. Current methods attempt to allow for simultaneous monitoring of audio feeds from various cameras by enabling a user to switch the surveillance/security camera's audio feed that the user is receiving via a manual selection. However, manually selecting which audio channel to receive is impractical in certain scenarios, such as when a user is viewing a monitor from a distance and thus, the computer is not in reach. Additionally, current methods attempt to allow for simultaneous monitoring of audio feeds from various cameras by comprising preset triggers, such as a camera capturing certain movements, that when activated, will switch the audio feed that a user is receiving to the audio feed that was activated by the trigger. However, these triggers are not based on the focus of a user or multiple users and are based on the video data that is captured by the cameras and thus, lack flexibility and accuracy. Thus, a method, a computer system, and a computer program product for simultaneous monitoring of audio feeds from various cameras are needed that can support a single user and multiple users are needed.

Thus, embodiments of the present invention may provide advantages, as explained in the subsequent paragraphs, including, but not limited to, a seamless user experience, audio-video synchronization, and implementing user attention awareness in multi-monitor systems, by automatically switching the audio feed that a user is receiving to an audio feed that matches the displayed video feed that the user is dynamically viewing on a monitor. Additionally, embodiments of the present invention may provide an advantage of independent user monitoring by automatically switching the audio feeds that one or more users are receiving to match the displayed video feeds that the one or more users are dynamically viewing on the monitors. The present invention can coordinate the dynamic process of determining which monitors one or more users are viewing at any given time and adjusting the audio feeds that the one or more users are receiving accordingly. The present invention does not require that all advantages need to be incorporated into every embodiment of the invention.

The embodiments mentioned in this paragraph are further illustrated and described below in the discussions of FIGS. 1, 2, and 3. According to at least one embodiment, captured video and audio feeds from surveillance/security cameras can be received. According to at least one other embodiment, capturing the live video stream may be performed using a wearable camera mounted to a pair of goggles or a wearable camera embedded into the pair of goggles. According to at least one embodiment, at least one of the captured videos in at least one monitor in a multi-monitor setup can be displayed. According to at least one embodiment, a captured live video stream to detect one or more monitors in the multi-monitor setup can be continuously analyzed. According to at least one embodiment, a currently viewed monitor in the multi-monitor setup can be determined using one or more computer vision techniques. According to at least one embodiment, an audio feed that is synchronized with a video feed that corresponds with the currently viewed monitor can be automatically outputted.

The embodiments mentioned in this paragraph are further illustrated and described below in the discussions of FIGS. 1, 2, and 3. According to at least one other embodiment, whether a different monitor in the multi-monitor setup is being viewed may be dynamically determined. According to at least one other embodiment, upon determining that the different monitor in the multi-monitor setup is being viewed, the outputted audio feed may be dynamically switched to an audio feed that is synchronized with a video feed that corresponds with the different monitor being viewed.

The embodiments mentioned in this paragraph are further illustrated and described below in the discussions of FIGS. 1, 2, and 3. According to at least one other embodiment wherein more than one captured live video stream is continuously analyzed to detect one or more monitors in the multi-monitor setup, one or more currently viewed monitors in the multi-monitor setup may be determined using one or more computer vision techniques. According to at least one other embodiment wherein more than one captured live video stream is continuously analyzed to detect one or more monitors in the multi-monitor setup, one or more audio feeds that are synchronized with one or more respective video feeds that correspond with the one or more monitors being currently viewed may be automatically outputted. According to at least one other embodiment, whether at least one different monitor in the multi-monitor setup is being viewed may be dynamically determined. According to at least one other embodiment, upon determining that the at least one different monitor in the multi-monitor setups is being viewed, the one or more respective outputted audio feeds may be dynamically switched to one or more audio feeds that are synchronized with one or more respective video feeds that correspond with the at least one different monitor being viewed.

The present invention may be a system, a method, and/or a computer program product at any possible technical detail level of integration. The computer program product may include a computer-readable storage medium (or media) having computer-readable program instructions thereon for causing a processor to carry out aspects of the present invention.

Various aspects of the present disclosure are described by narrative text, flowcharts, block diagrams of computer systems, and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

The following described exemplary embodiments provide a system, method, and program product for multi-monitor automatic audio feed adjustment, comprising receiving captured video and audio feeds from surveillance/security cameras; displaying at least one of the captured videos in at least one monitor in a multi-monitor setup; continuously analyzing a captured live video stream to detect one or more monitors in the multi-monitor setup; determining a currently viewed monitor in the multi-monitor setup using one or more computer vision techniques; and automatically outputting either a one-way or two-way audio feed that is synchronized with a video feed that corresponds with the currently viewed monitor. Additionally, the following described exemplary embodiments may provide a system, method, and program product for multi-monitor automatic audio feed adjustment, further comprising determining whether a different monitor in the multi-monitor setup is being viewed; and upon determining that the different monitor in the multi-monitor setup is being viewed, dynamically switching the outputted audio feed to an audio feed that is synchronized with a video feed that corresponds with the different monitor being viewed.

Beginning now with FIG. 1, an exemplary networked computer environment 100 is depicted, according to at least one embodiment. Computing environment 100 contains an example of an environment for the execution of at least some of the computer code involved in performing the inventive methods, such as multi-monitor automatic audio feed adjustment code 200, otherwise referred to as "multi-monitor automatic audio feed adjustment program 200", or "the program 200". In addition to code block 200, computing environment 100 includes, for example, computer 101, wide area network (WAN) 102, end-user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and code block 200, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer, or any other form of computer or mobile device now known or to be developed in the future that is capable of running an algorithm, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off-chip." In some computing environments, processor set 110 may be designed for working with qubits and performing quantum computing.

Computer-readable program instructions are typically loaded onto computer 101 to cause a series of operational steps to be performed by processor set 110 of computer 101 and thereby affect a computer-implemented method, such that the instructions thus executed will instantiate the methods specified in flowcharts and/or narrative descriptions of computer-implemented methods included in this document (collectively referred to as "the inventive methods"). These computer-readable program instructions are stored in various types of computer-readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in code block 200, in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports, and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read-only memory (ROM), but typically at least a portion of the persistent storage allows writing of data, deletion of data, and re-writing of data. Some familiar forms of persistent storage include magnetic disks and solid-state storage devices. Operating system 122 may take several forms, such as various known proprietary operating systems or open-source Portable Operating System Interface type operating systems that employ a kernel. The code included in code block 200, typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), beacon connections (for example, location-based services (LBS)), virtual beacon connections, connections made through local area communication networks and even connections made through wide area networks such as the internet. Additionally, peripheral device set 114 may comprise one or more surveillance/security cameras 114. In various embodiments, UI device set 123 may include components such as a display screen, speaker, microphone, wearable devices (such as goggles and smart watches), keyboard, mouse, printer, touchpad, game controllers, and haptic devices. In various embodiments, UI device set 123 may comprise one or more video acquisition devices 123, such as a camera 123. In at least one embodiment, goggles 123 may comprise a camera 123 mounted onto the goggles 123 and/or built directly into the goggles 123 frame. The camera 123 may be mounted 123 or built directly into the goggles 123 in a position that is aligned with a user's line of sight. The lenses of the goggles 123 may be equipped with auto-focus and image stabilization capabilities. In some embodiments, the goggles 123 may be equipped to perform eye tracking techniques on the eyes of the goggles' 123 wearers using image recognition. Additionally, UI device set 123 may comprise headphones 123. Additionally, UI device set 123 may comprise visual display units ("VDU") 123, such as monitors 123/screens 123. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer-readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as application-specific integrated circuits ("ASICs"), copper transmission cables, optical transmission fibers, wireless transmission, routers, firewalls, switches, gateway computers, and edge servers.

END USER DEVICE (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer, and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs, and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community, or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The database 130 may be a digital repository capable of data storage and data retrieval. The database 130 can be present in the remote server 104 and/or any other location in the network 102. The database 130 can comprise machine learning models, such as the models applied to perform the computer vision techniques. Additionally, the database 130 can comprise information related to the monitors 123 in a multi-monitor 123 setup, such as the signature marks that a monitor 123 displays.

According to the present embodiment, the multi-monitor automatic audio feed adjustment program 200 may be a program capable of detecting the monitor 123 that a user is currently viewing in a multi-monitor 123 setup using computer vision techniques, outputting the audio feed that is synchronized with the video feed of the surveillance/security camera 114 that is being displayed on the currently viewed monitor 123, through headphones 123, to the user, determining when a different monitor 123 is being viewed by the user, and dynamically switching the audio feed the user is receiving to match the video feed of the surveillance/security camera 114 that is being displayed on the newly viewed monitor 123. The program 200 may be located on client computing device 101 or remote server 104 or on any other device located within network 102. Furthermore, the program 200 may be distributed in its operation over multiple devices, such as client computing device 101 and remote server 104. The multi-monitor automatic audio feed adjustment method is explained in further detail below with respect to FIG. 2.

Figure 2:
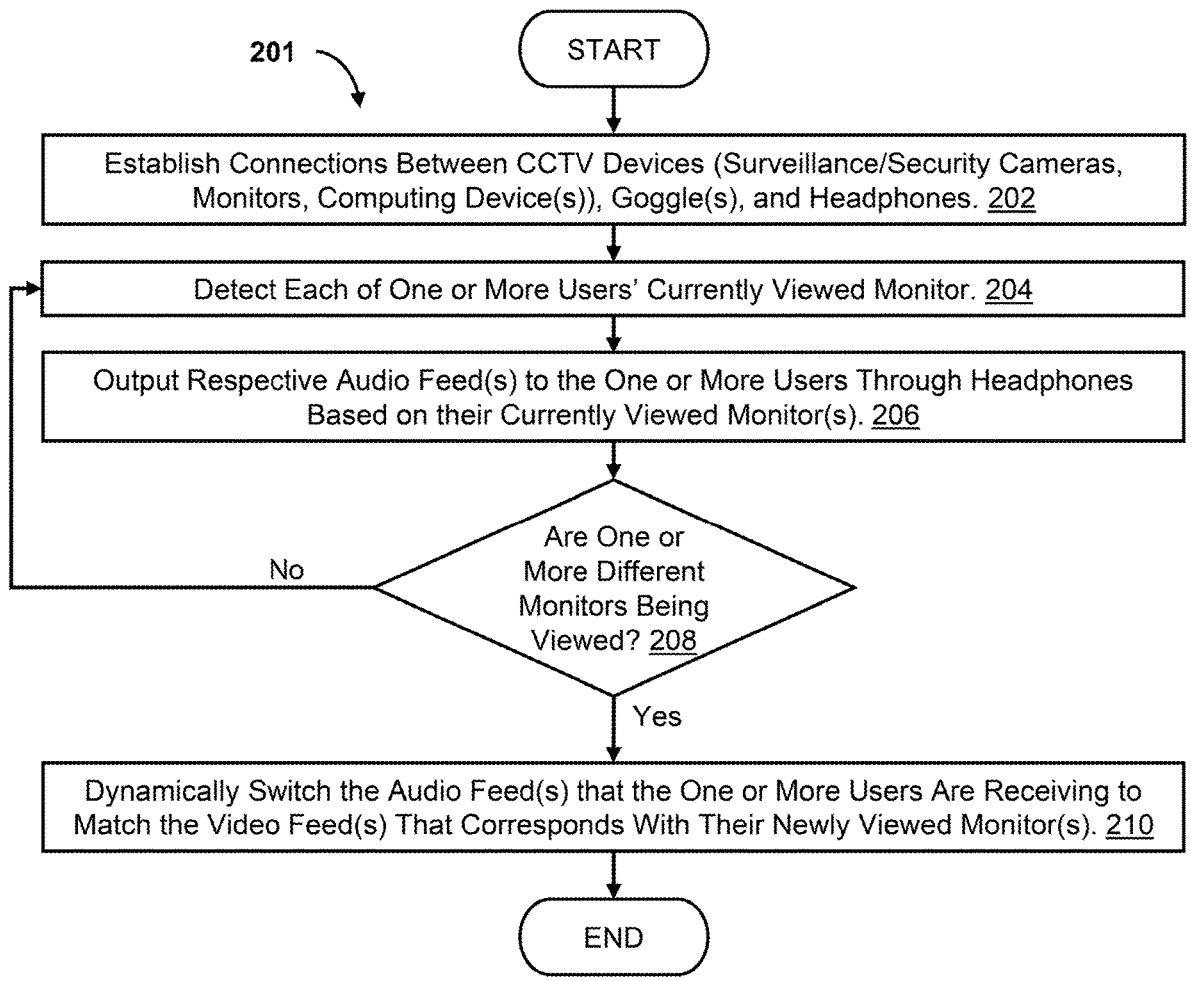
FIG. 2 is an operational flowchart illustrating a multi-monitor automatic audio feed adjustment process according to at least one embodiment.

FIG. 2 is an operational flowchart illustrating multi-monitor automatic audio feed adjustment process 201 according to at least one embodiment. At 202, the program 200 establishes connections between the CCTV devices 101, 114, 123, and goggles 123 and headphones 123 from UI device set 123. CCTV devices 101, 114, and 123, may comprise computer 101, more than one visual display unit 123, such as a multi-monitor 123 setup or multi-screen 123 setup, and more than one surveillance/security camera 114. The program 200 can establish connections between the CCTV devices 101, 114, 123, the goggles 123, and the headphones 123 using network module 115. A multi-monitor 123 setup and a multi-screen 123 setup may comprise multiple display monitors 123/screens 123 connected to the computing device 101. A pair of goggles 123 and headphones 123 may both be worn by a user. A user may comprise a goggles' 123 wearer and a headphone's 123 wearer. Additionally, devices 114, and 123, may be connected through wired connections using electrical cables.

Surveillance/security cameras 114 can capture video, of the camera 114's field of view, and audio, of the camera's 114 physical surroundings. The program 200 can continually receive the captured video and audio from the surveillance/security cameras 114. The program 200 can display each captured video feed in a respective monitor 123 in the multi-monitor 123 setup.

In some embodiments, the program 200 may establish connections between the CCTV devices 114, and 123, more than one computing device 101, more than one pair of goggles 123, and more than one pair of headphones 123. In such embodiments, there may comprise one computing device 101, one pair of goggles 123, and one pair of headphones 123, connected per user. In such embodiments comprising more than one computing device 101, one (1) computing device 101 may operate a master audio feed adjustment control module 302, while the other computing devices 101 may operate slave audio feed adjustment control module 302A. The master audio feed adjustment control module 302 can send commands to the slave audio feed adjustment control module 302A to display the flashing signature marks on their respective monitors 123.

At 204, the program 200 detects the monitor 123 that the user is currently viewing by analyzing a live video stream using the audio feed adjustment control module 302. The module 302 can generate signature marks, including but not limited to, shapes, symbols, or letters, in each monitor 123. The generated signature marks can continuously flash in three (3) or four (4) corners of each monitor 123. The signature marks may be identical or different in color and/or shape. The module 302 can synchronize the timing and intervals of the flashes for a monitor 123. The module 302 can distinctly synchronize the timing and intervals of the flashes for each monitor 123. The program 200 can store information related to the monitors 123 in a multi-monitor 123 setup, such as the signature marks that are displayed by a monitor 123 along with their distinct timing and intervals of the signature marks, in the database 130 by saving the information in files. The module 302 can retrieve the information from the database 130 during the process of detecting a monitor 123 that a user is currently viewing.

The program 200 may continuously receive a live video stream from the camera 123 mounted on or embedded in the goggles 123 being worn by the user. The program 200 can identify if one or more monitors 123 are in a live video stream based on identified flashes within the camera's 123 field of view. Specifically, the program 200 can identify that a specific monitor 123 is being captured in the live video stream based upon the dynamic detection of a monitor's 123 display of its distinct signature marks and the timing/intervals of its flashes. The program 200 can analyze the live video using computer vision techniques, such as OpenCV, to detect the presence of the signature marks. If more than one monitor 123 is detected in a live video stream, the program 200 may determine which monitor's 123 screen center is closest to the center of the camera 123. The program 200 can calculate the screen center of a monitor 123 using the signature marks that are displayed in the corners of the screen 123 using computer vision techniques. The module 302 can determine the monitor 123 that the user is currently viewing by comparing the center of the camera's 123 live video stream with the calculated screen centers of the monitors 123, i.e., determining which monitor's 123 center is nearest to the center of the camera 123. In some embodiments, the program 200 may analyze a live video stream using image recognition to perform eye tracking techniques, such as eye-ball gazing detection, on the eyes of the goggles' 123 wearer, to detect the user's currently viewed monitor.

In embodiments comprising more than one user, the program 200 may detect the monitor(s) 123 that each user is currently viewing. The program 200 may continuously receive the live video streams from the cameras 123 mounted on or embedded in the goggles 123 being worn by the users. The program 200 may analyze the received live video from each camera 123 in the same method as explained above in Step 204.

At 206, the program 200 outputs the audio feed that corresponds with the video feed of the surveillance/security camera 114 that is being displayed on the currently viewed monitor 123, through headphones 123 to the user. The program 200 can output the audio feed that corresponds with the video feed that is being displayed on the currently viewed monitor 123 by muting the audio feeds corresponding with the video feeds of the other surveillance/security cameras 114 that are being displayed on monitors 123 that are not being viewed by the user. The program 200 can leave the audio feed that corresponds with the video feed of the surveillance/security camera 114 that is being displayed on the currently viewed monitor 123 unmuted so that the feed is outputted to the user's headphones 123. In embodiments where the headphones 123 comprise a microphone and the surveillance/security camera 114 whose audio feed is being outputted to the user's headphones 123 comprises a speaker, the program 200 may send the voice of the user to the associated surveillance/security camera 114, and the associated surveillance/security camera 114 may output the user's voice, i.e., the audio feed can be two-way.

In embodiments comprising more than one user, the program 200 may output the audio feeds that correspond with the video feeds of the surveillance/security cameras 114 that are being displayed on the respective currently viewed monitor(s) 123 to the users through their respective pair of headphones 123. The program 200 may output the audio feeds in the same method as explained above in Step 206.

At 208, the program 200 determines when a different monitor 123 is being viewed by the user. According to one implementation, in response to determining that a different monitor 123 is being viewed by the user (step 208, "YES" branch), the program 200 may continue to step 210 to dynamically switch the audio feed the user is receiving to match the video feed of the surveillance/security camera 114 that is being displayed on the newly viewed monitor 123. The program 200 may determine that a different monitor 123 is being viewed by the user, upon the dynamic detection of a different monitor's 123 display of its distinct signature marks and the timing/intervals of its flashes. In response to determining that the user is currently viewing the same monitor 123 (step 208, "NO" branch), the program 200 may continue to output the audio feed that corresponds with the video feed of the surveillance/security camera 114 that is being displayed on the currently viewed monitor 123, through headphones 123 to the user and dynamically detect the monitor 123 that the user is viewing as in Steps 204 and 206. The program 200 may determine that the same monitor 123 is being viewed by the user based on continuously detecting the monitor's 123 display of its distinct signature marks and the timing/intervals of its flashes.

In embodiments comprising more than one user, the program 200 may determine when one or more different monitors 123 are being viewed by the users. The program 200 may determine when one or more different monitors 123 are being viewed by the users in the same method as explained above in Step 208. Additionally, the program 200 may determine that the same monitors 123 are being viewed by the users in the same method as explained above in Step 208.

At 210, upon determining that the user is viewing a different monitor 123, the program 200 dynamically switches the audio feed the user is receiving to match the video feed of the surveillance/security camera 114 that is being displayed on the newly viewed monitor 123. The program 200 can switch an outputted audio feed by muting the audio feed that the user is currently receiving and unmuting the audio feed corresponding with the video feed of the surveillance/security camera 114 that is being displayed on the different monitor 123 that is now being viewed by the user so that the feed is outputted to the user's headphones 123.

In embodiments comprising more than one user, upon determining that at least one different monitor 123 is being viewed by the users, the program 200 may dynamically switch the one or more respective outputted audio feeds to the one or more audio feeds that are synchronized with the one or more respective video feeds that correspond with the at least one different monitor 123 being viewed by the users. The program 200 may dynamically switch the one or more respective outputted audio feeds in the same method as explained above in Step 210.

Figure 3:
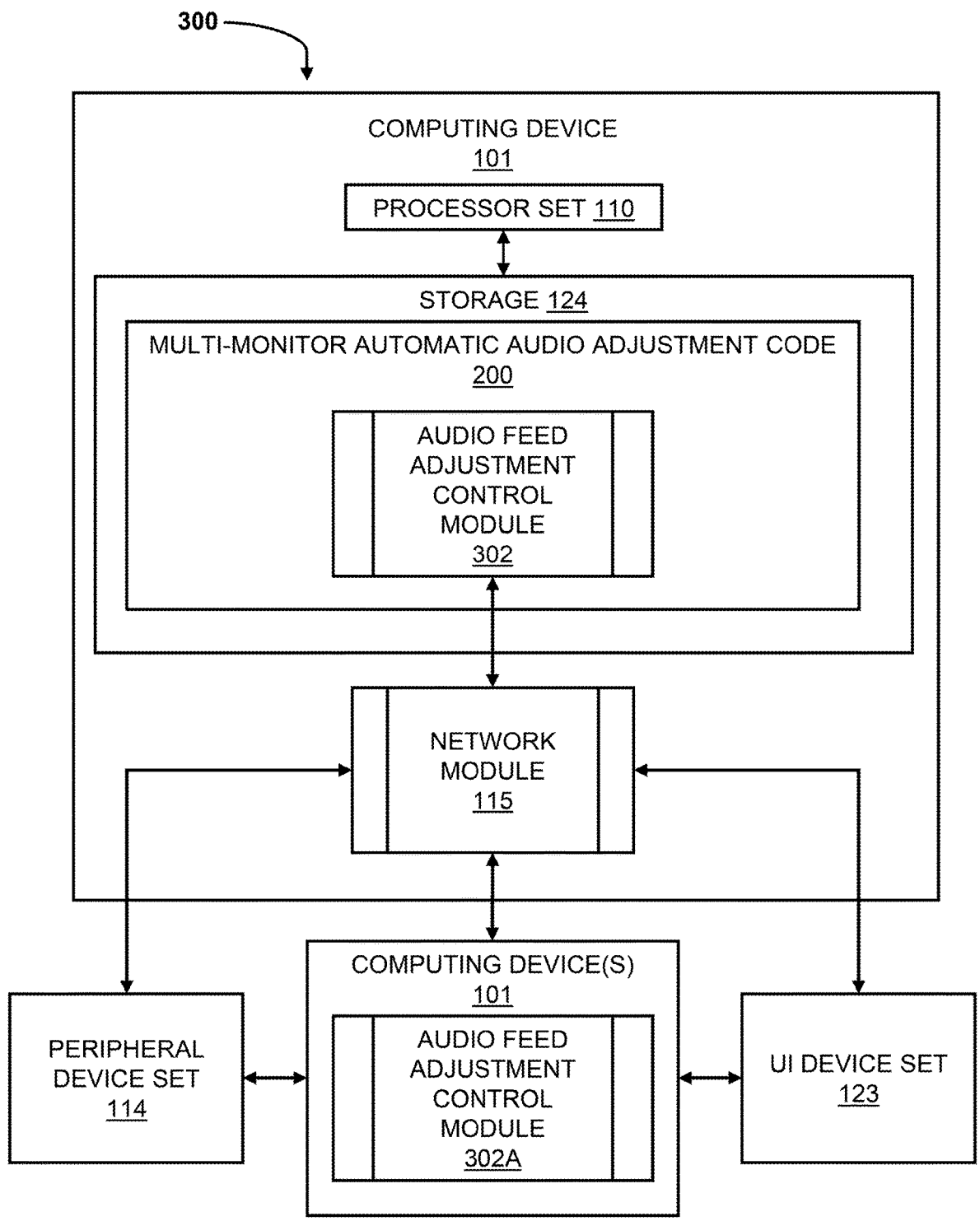
FIG. 3 is a system diagram illustrating an exemplary program environment of an implementation of a multi-monitor automatic audio feed adjustment process according to at least one embodiment.

Referring now to FIG. 3, a system diagram illustrating an exemplary program environment 300 of an implementation of a multi-monitor automatic audio feed adjustment process 201 is depicted according to at least one embodiment. Here, the program 200 comprises an audio feed adjustment control module 302. The exemplary program environment 300 details the interactions between the audio feed adjustment control module 302 and the network module 115. Additionally, the exemplary program environment 300 details the interactions between the network module 115 and the peripheral device set 114 and the network module 115 and the UI device set 123. In at least one embodiment, the exemplary program environment 300 details the interactions between the network module 115 and one or more computing devices 101 comprising audio feed adjustment control module 302A, the one or more computing devices 101 comprising audio feed adjustment control module 302A and the peripheral device set 114, and the one or more computing devices 101 comprising audio feed adjustment control module 302A and the UI device set 123.

The network module 115 may be used to establish connections and communications between computer 101, the program 200 (i.e., audio feed adjustment control module 302), one or more computing devices 101 comprising audio feed adjustment control module 302A, peripheral device set 114, and UI device set 123. The audio feed adjustment control module 302, otherwise referred to as the "master audio feed adjustment control module 302", may be used to implement the multi-monitor automatic audio feed adjustment method 201, as described above in Steps 202, 204, 206, 208, and 210, comprising coordinating the dynamic process of determining which monitor 123 one or more users are viewing at any given time and adjusting the audio feeds that one or more users are receiving, such as through their one or more headphones 123, accordingly. Specific functions of the module 302 include but are not limited to, managing the displaying/flashing of signature marks, communicating with camera(s) 123, processing live video streams, and determining a monitor 123 that a user is dynamically viewing. In some embodiments, the master audio feed adjustment control module 302 may serve as the communication hub to one or more slave audio feed adjustment control modules 302A.

In such embodiments, slave audio feed adjustment control modules 302A may be used to receive commands from the master audio feed adjustment control module 302 and to communicate with monitors 123, goggles 123, and headphones 123, connected to the computing devices 101 that comprise the slave audio feed adjustment control modules 302A.

It may be appreciated that FIGS. 2 through 3 provide only an illustration of one implementation and do not imply any limitations with regard to how different embodiments may be implemented. Many modifications to the depicted environments may be made based on design and implementation requirements.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for multi-monitor automatic audio feed adjustment, the method comprising:
    receiving captured video and audio feeds from surveillance/security cameras;
    displaying at least one of the captured videos in at least one monitor in a multi-monitor setup;
    continuously analyzing a captured live video stream to detect one or more monitors in the multi-monitor setup;
    determining a currently viewed monitor in the multi-monitor setup using one or more computer vision techniques further comprising:
    dynamically detecting more than one monitor's displays of their distinct signature marks and timing/intervals of their flashes in the captured live video stream;
    determining a distance between a center of a wearable camera capturing the live video stream and at least one screen center of at least one of the more than one monitor; and
    determining a monitor in the more than one monitor that is the currently viewed monitor based on a closest distance from the center of the wearable camera to the at least one screen center of at least one of the more than one monitor; and
    automatically outputting either a one-way or two-way audio feed that is synchronized with a video feed that corresponds with the currently viewed monitor.

2. The method of claim 1, the method further comprising:
    dynamically determining whether a different monitor in the multi-monitor setup is being viewed; and
    upon determining that the different monitor in the multi-monitor setup is being viewed, dynamically switching the outputted audio feed to an audio feed that is synchronized with a video feed that corresponds with the different monitor being viewed.

3. The method of claim 1, wherein determining the currently viewed monitor in the multi-monitor setup using the one or more computer vision techniques further comprises:
    dynamically detecting one of the one or more monitor's displays of its distinct signature marks and timing/intervals of its flashes in the captured live video stream.

4. The method of claim 1, wherein more than one captured live video stream is continuously analyzed to detect one or more monitors in the multi-monitor setup; one or more currently viewed monitors in the multi-monitor setup are determined using the one or more computer vision techniques; and one or more audio feeds that are synchronized with one or more respective video feeds that correspond with the one or more currently viewed monitors are automatically outputted.

5. The method of claim 4, the method further comprising:
    dynamically determining whether at least one different monitor in the multi-monitor setup is being viewed; and
    upon determining that the at least one different monitor in the multi-monitor setup is being viewed, dynamically switching the one or more outputted audio feeds respectively to one or more audio feeds that are synchronized with one or more respective video feeds that correspond with the at least one different monitor being viewed.

6. The method of claim 1, wherein capturing the live video stream is performed using a wearable camera mounted to a pair of goggles or a wearable camera embedded into the pair of goggles.

7. A computer system for multi-monitor automatic audio feed adjustment, the computer system comprising:
    one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
    receiving captured video and audio feeds from surveillance/security cameras;
    displaying at least one of the captured videos in at least one monitor in a multi-monitor setup;
    continuously analyzing a captured live video stream to detect one or more monitors in the multi-monitor setup;
    determining a currently viewed monitor in the multi-monitor setup using one or more computer vision techniques, further comprising:
    dynamically detecting more than one monitor's displays of their distinct signature marks and timing/intervals of their flashes in the captured live video stream;
    determining a distance between a center of a wearable camera capturing the live video stream and at least one screen center of at least one of the more than one monitor; and
    determining a monitor in the more than one monitor that is the currently viewed monitor based on a closest distance from the center of the wearable camera to the at least one screen center of at least one of the more than one monitor; and
    automatically outputting either a one-way or two-way audio feed that is synchronized with a video feed that corresponds with the currently viewed monitor.

8. The computer system of claim 7, the method further comprising:
    dynamically determining whether a different monitor in the multi-monitor setup is being viewed; and
    upon determining that the different monitor in the multi-monitor setup is being viewed, dynamically switching the outputted audio feed to an audio feed that is synchronized with a video feed that corresponds with the different monitor being viewed.

9. The computer system of claim 7, wherein determining the currently viewed monitor in the multi-monitor setup using the one or more computer vision techniques further comprises:
dynamically detecting one of the one or more monitor's displays of its distinct signature marks and timing/intervals of its flashes in the captured live video stream.

10. The computer system of claim 7, wherein more than one captured live video stream is continuously analyzed to detect one or more monitors in the multi-monitor setup; one or more currently viewed monitors in the multi-monitor setup are determined using the one or more computer vision techniques; and one or more audio feeds that are synchronized with one or more respective video feeds that correspond with the one or more currently viewed monitors are automatically outputted.

11. The computer system of claim 10, the method further comprising:
dynamically determining whether at least one different monitor in the multi-monitor setup is being viewed; and
upon determining that the at least one different monitor in the multi-monitor setup is being viewed, dynamically switching the one or more outputted audio feeds respectively to one or more audio feeds that are synchronized with one or more respective video feeds that correspond with the at least one different monitor being viewed.

12. The computer system of claim 7, wherein capturing the live video stream is performed using a wearable camera mounted to a pair of goggles or a wearable camera embedded into the pair of goggles.

13. A computer program product for multi-monitor automatic audio feed adjustment, the computer program product comprising:
one or more computer-readable tangible storage medium and program instructions stored on at least one of the one or more tangible storage medium, the program instructions executable by a processor to cause the processor to perform a method comprising:
receiving captured video and audio feeds from surveillance/security cameras;
displaying at least one of the captured videos in at least one monitor in a multi-monitor setup;
continuously analyzing a captured live video stream to detect one or more monitors in the multi-monitor setup;
determining a currently viewed monitor in the multi-monitor setup using one or more computer vision techniques, further comprising:
dynamically detecting more than one monitor's displays of their distinct signature marks and timing/intervals of their flashes in the captured live video stream;
determining a distance between a center of a wearable camera capturing the live video stream and at least one screen center of at least one of the more than one monitor; and
determining a monitor in the more than one monitor that is the currently viewed monitor based on a closest distance from the center of the wearable camera to the at least one screen center of at least one of the more than one monitor; and
automatically outputting either a one-way or two-way audio feed that is synchronized with a video feed that corresponds with the currently viewed monitor.

14. The computer program product of claim 13, the method further comprising:
dynamically determining whether a different monitor in the multi-monitor setup is being viewed; and
upon determining that the different monitor in the multi-monitor setup is being viewed, dynamically switching the outputted audio feed to an audio feed that is synchronized with a video feed that corresponds with the different monitor being viewed.

15. The computer program product of claim 13, wherein determining the currently viewed monitor in the multi-monitor setup using the one or more computer vision techniques further comprises:
dynamically detecting one of the one or more monitor's displays of its distinct signature marks and timing/intervals of its flashes in the captured live video stream.

16. The computer program product of claim 13, wherein more than one captured live video stream is continuously analyzed to detect one or more monitors in the multi-monitor setup; one or more currently viewed monitors in the multi-monitor setup are determined using the one or more computer vision techniques; and one or more audio feeds that are synchronized with one or more respective video feeds that correspond with the one or more currently viewed monitors are automatically outputted.

17. The computer program product of claim 16, the method further comprising:
dynamically determining whether at least one different monitor in the multi-monitor setup is being viewed; and
upon determining that the at least one different monitor in the multi-monitor setup is being viewed, dynamically switching the one or more outputted audio feeds respectively to one or more audio feeds that are synchronized with one or more respective video feeds that correspond with the at least one different monitor being viewed.

\* \* \* \* \*